United States Patent [19]

Tokumasu et al.

[11] Patent Number: 5,040,206
[45] Date of Patent: Aug. 13, 1991

[54] COMMUNICATION APPARATUS HAVING DRIVING MECHANISM AND SPEAKER-PHONE

[75] Inventors: Takahiko Tokumasu, Atsugi; Shinichi Nishimura, Isehara, both of Japan

[73] Assignee: Ricoh Company, Ltd., Tokyo, Japan

[21] Appl. No.: 471,635

[22] Filed: Jan. 29, 1990

[30] Foreign Application Priority Data

Feb. 1, 1989 [JP] Japan .................................. 1-11680
Mar. 16, 1989 [JP] Japan .................................. 1-65121
Jul. 3, 1989 [JP] Japan .................................. 1-172131

[51] Int. Cl.⁵ .......................................... H04M 11/00
[52] U.S. Cl. .................................. 379/100; 379/420; 358/400
[58] Field of Search .................. 379/85, 100, 420; 181/201, 202; 358/400, 401, 442; 381/93, 158

[56] References Cited

U.S. PATENT DOCUMENTS

| | | | |
|---|---|---|---|
| 3,928,723 | 12/1975 | Kai | 379/420 |
| 4,008,376 | 2/1977 | Flanagan et al. | 379/420 |
| 4,025,728 | 5/1977 | Jacobson | 379/420 |
| 4,078,155 | 3/1978 | Botros et al. | 379/420 |
| 4,178,488 | 12/1979 | Nishihata | 379/420 |
| 4,225,754 | 9/1980 | Bernard et al. | 379/420 |
| 4,330,690 | 5/1982 | Botros | 379/420 |
| 4,691,336 | 9/1987 | Durston | 379/420 |
| 4,833,547 | 5/1989 | Mase | 358/400 |
| 4,935,955 | 6/1990 | Neudorfer | 379/100 |

FOREIGN PATENT DOCUMENTS 59-230356 12/1984 Japan .

OTHER PUBLICATIONS

Teleconnect Magazine, vol. 7, Issue 9, Sep. 1989.
Telephony, vol. 215, No. 20, Nov. 14, 1988.
Newsweek, Dec. 1986.

Primary Examiner—Jin F. Ng
Assistant Examiner—Ahmad F. Matar
Attorney, Agent, or Firm—Oblon, Spivak, McClelland, Maier & Neustadt

[57] ABSTRACT

A communication apparatus comprises a casing, a driving mechanism provided within the casing and generating a driving sound when enabled, and a speaker-phone including a speaker and a microphone for making a hand-free call when enabled. The driving mechanism is arranged at a position within the casing isolated from the microphone, and the speaker is arranged at a position on the casing isolated from the microphone. The communication apparatus has a mode in which both the driving mechanism and the speaker-phone are enabled simultaneously.

18 Claims, 11 Drawing Sheets

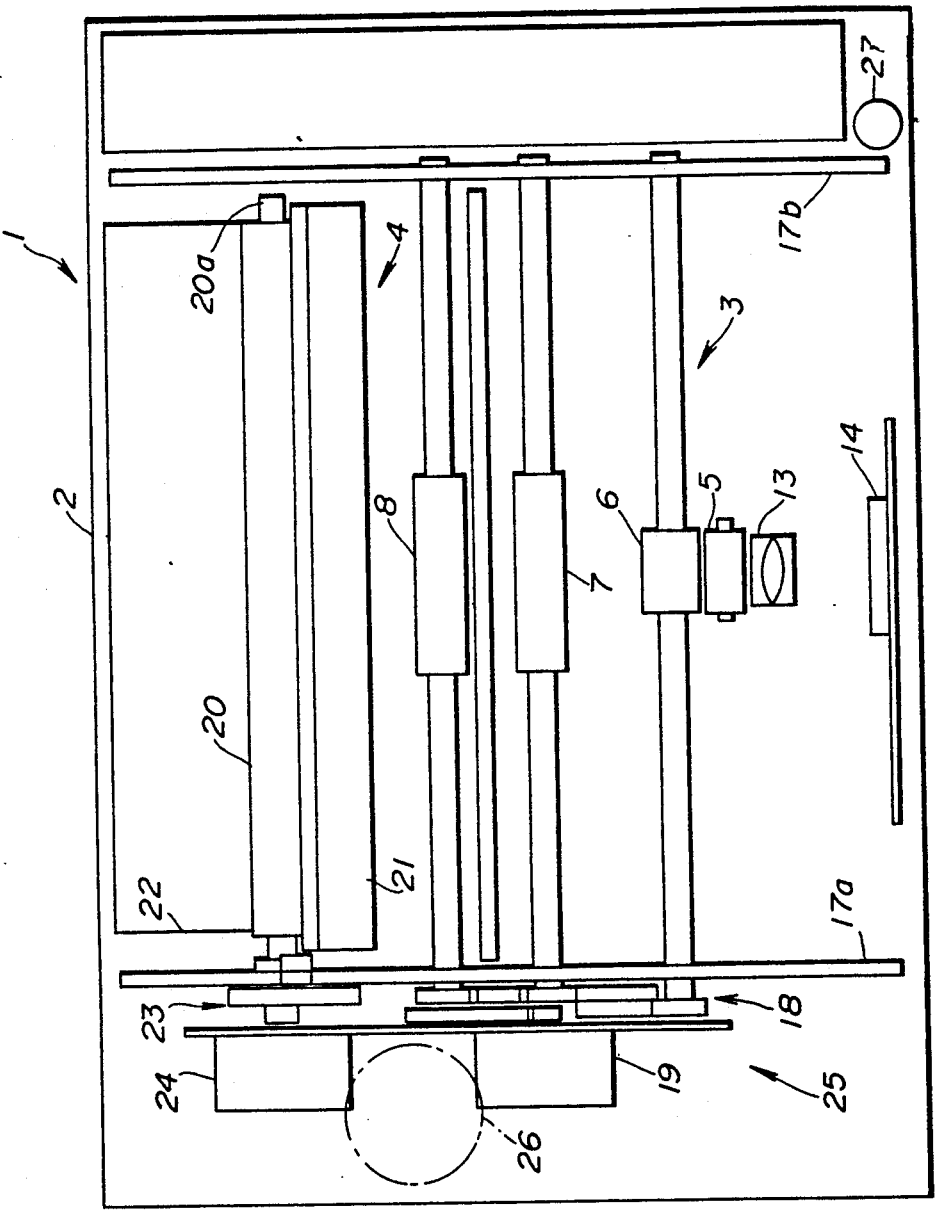

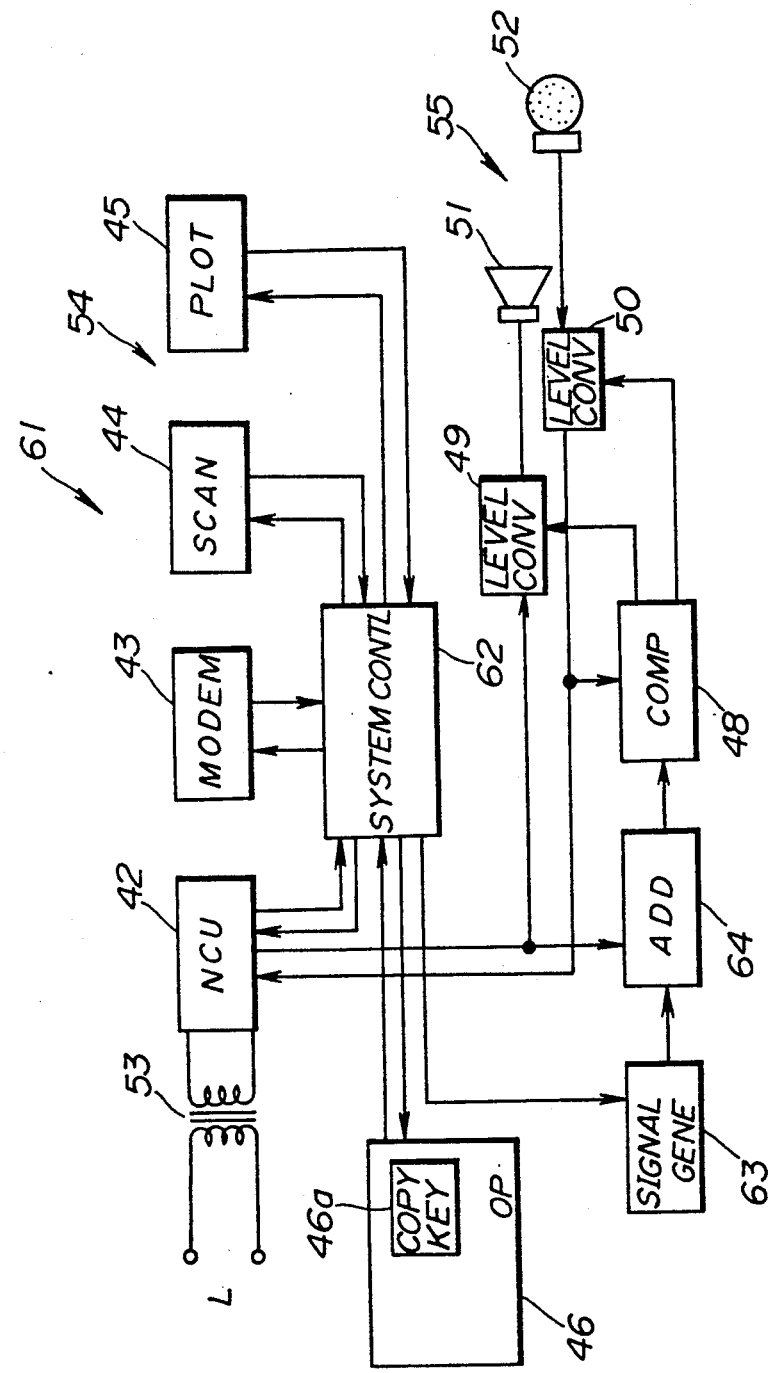

COMMUNICATION APPARATUS HAVING DRIVING MECHANISM AND SPEAKER-PHONE

BACKGROUND OF THE INVENTION

The present invention generally relates to communication apparatuses, and more particularly to a communication apparatus which is provided with a driving mechanism and a speaker-phone.

Recently, various functions have been added to communication apparatus, and there is a communication apparatus which has a speaker-phone function (or hand-free function) which enables a call without unhooking a handset. Facsimile machines and multi-function telephone sets are examples of such a communication apparatus. The communication apparatus having the speaker-phone function is provided with a speaker for outputting the information which is received from the other end of the telephone line and a microphone for inputting the information which is to be transmitted to the destination via the telephone line.

On the other hand, the communication apparatus having the speaker-phone function is usually provided with a driving mechanism. In the case of a facsimile machine, for example, a scanner part has a document transport mechanism and a plotter part has a recording sheet transport mechanism. In the case of a multi-function telephone set, a cassette tape recorder is provided for use in an answering phone mode, for example.

But in the conventional communication apparatus having the speaker-phone function, the microphone is arranged at a position with an emphasis on picking up the sound and the speaker is arranged at a position with an emphasis on audibility. Hence, there is a problem in that the sound from the speaker is picked up by the microphone to generate what is so-called howling. In the communication apparatus which is provided with the driving mechanism, there are cases where the driving mechanism and the speaker-phone function are used simultaneously, owing to the various functions available on the communication apparatus. For example, the driving mechanism and the speaker-phone function are used simultaneously when recording the contents of the call made via the speaker-phone on the cassette tape recorder in the case of the telephone set provided with the cassette tape recorder, when recording a message on a first line in the answering phone mode while making a call on a second line via the speaker-phone in the case of the telephone set which accommodates two lines, and when making a facsimile communication on a first line while making a call on a second line via the speaker-phone in the case of the facsimile machine which accommodates two lines. In these cases, there is a problem in that the call is interfered with by noise which is generated by the driving sound of the driving mechanism picked up on the microphone of the speaker-phone.

In order to prevent the howling of the speaker-phone, it is conceivable to switch the transmission function and the reception function of the speaker-phone depending on a result of a comparison of the transmission signal level from the microphone and the reception signal level from the line. However, when the speaker-phone and the driving mechanism are used simultaneously, there is a problem in that the speaker-phone is constantly set to the transmission mode when the driving sound is generated and picked up on the microphone.

On the other hand, when the driving mechanism operates while the speaker-phone is in use, there is a problem in that it is difficult to understand the received message from the speaker due to the noise generated by the driving mechanism. To overcome this problem, a Japanese Laid-Open Patent Application No. 59-230356 proposes to detect a surrounding noise level and to control a gain compression circuit and a gain expansion circuit of the reception system based on the detected noise level. However, the communication apparatus becomes expensive in this case because of the need to detect the surrounding noise level. In addition, since the volume itself is constant, there is a problem in that it is still difficult to understand the received message from the speaker when the noise level increases due to the operation of the driving mechanism.

SUMMARY OF THE INVENTION

Accordingly, it is a general object of the present invention to provide a novel and useful communication apparatus in which the problems described above are eliminated.

Another and more specific object of the present invention is to provide a communication apparatus comprising a casing, a driving mechanism provided within the casing and generating a driving sound when enabled, and a speaker-phone including a speaker and a microphone for making a hand-free call when enabled, where the driving mechanism is arranged at a position within the casing isolated from the microphone, the speaker is arranged at a position on the casing isolated from the microphone, and the communication apparatus has a mode in which both the driving mechanism and the speaker-phone are enabled simultaneously. According to the communication apparatus of the present invention, it is possible to prevent the driving sound of the driving mechanism from being picked up on the microphone of the speaker-phone. Hence, it is possible to realize an improved speaker-phone call.

Still another object of the present invention is to provide a communication apparatus comprising a driving mechanism which generates a driving sound when enabled, a speaker-phone including a speaker and a microphone for making a hand-free call when enabled, detecting means coupled to the speaker-phone for detecting whether or not the speaker-phone is in use, and control means coupled to the driving mechanism and the detecting means for disabling the driving mechanism when the use of the speaker-phone is detected by the detecting means. According to the communication apparatus of the present invention, it is possible to prevent the driving sound of the driving mechanism from being picked up on the microphone of the speaker-phone. Hence, it is possible to realize an improved speaker-phone call and also enable an appropriate switching of the transmission and reception function of the speaker-phone.

A further object of the present invention is to provide a communication apparatus comprising a driving mechanism which generates a driving sound when enabled, a speaker-phone coupled to at least one line and including a speaker and a microphone for making a hand-free call when enabled, function control means coupled to the speaker-phone for controlling the speaker-phone between a transmission function and a reception function based on a comparison of a level of a transmission signal received from the microphone and a level of a reception signal received from the line, signal generating means for generating a pseudo signal which has a level approximately equal to a transmission signal which is generated when the driving sound of the driving mechanism is picked up on the microphone, adding or substracting means coupled to the line for adding or subtracting the pseudo signal to or from the reception signal which is supplied to the function control means when the pseudo signal is generated from the signal generating means, and control means coupled to the signal generating means for controlling the signal generating means to generate the pseudo signal only during a mode in which both the driving mechanism and the speaker-phone are enabled simultaneously. According to the communication apparatus of the present invention, it is possible to enable the simultaneous use of the driving mechanism and the speaker-phone without deteriorating the quality of the speaker-phone call.

Another object of the present invention is to provide a communication apparatus comprising a driving mechanism which generates a driving sound when enabled, a speaker-phone including a speaker and a microphone for making a hand-free call when enabled, detecting means coupled to the driving mechanism for detecting whether or not the driving mechanism is in use, and control means coupled to the speaker-phone and the detecting means for automatically controlling a volume of sound output from the speaker depending on a detection result of the detecting means, where the communication apparatus has a mode in which both the driving mechanism and the speaker-phone are enabled simultaneously. According to the communication apparatus of the present invention, it is possible to prevent the sound of the reception signal from being interfered with by the driving sound of the driving mechanism and thus enabling the accurate understanding of the content of the speaker-phone call.

Other objects and further features of the present invention will be apparent from the following detailed description when read in conjunction with the accompanying drawings.

BRIEF DESCRIPTION OF THE DRAWINGS

FIG. 2 is a plan view of the first embodiment;

FIG. 10 is a system block diagram showing a fifth embodiment of the communication apparatus according to the present invention;

DESCRIPTION OF THE PREFERRED EMBODIMENTS

A description will be given of a first embodiment of a communication apparatus according to the present invention, by referring to FIGS. 1 through 5. In this embodiment, the present invention is applied to a facsimile machine.

Figure 1:
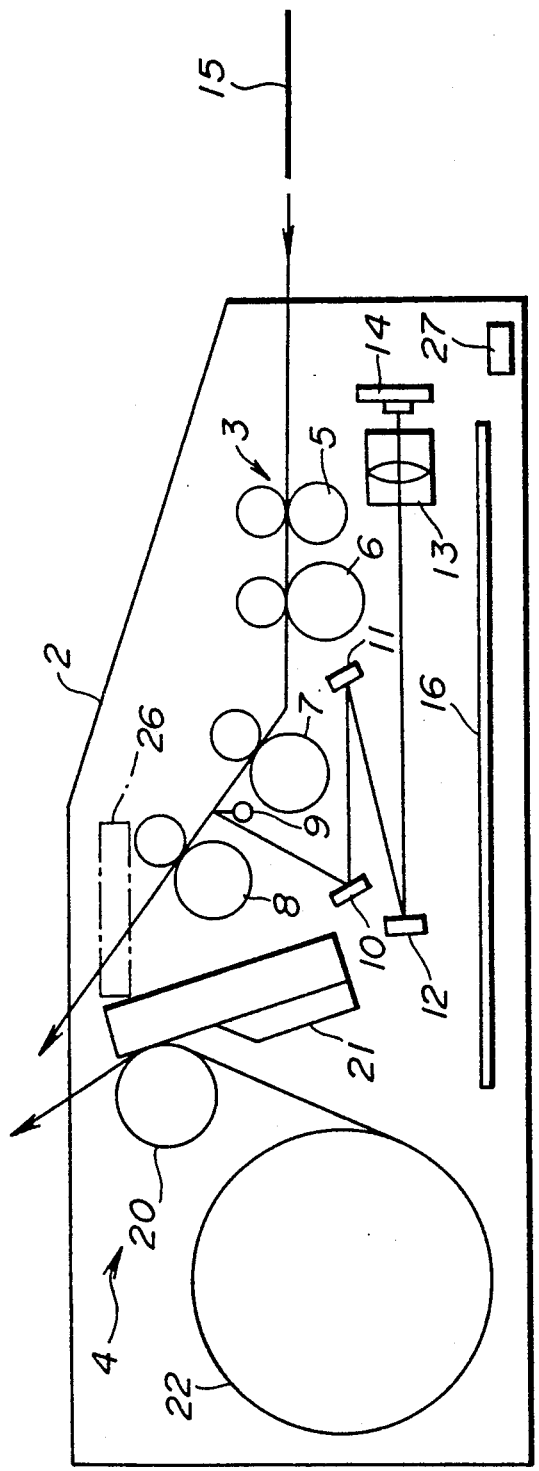
FIG. 1 is a side view showing a first embodiment of a communication apparatus according to the present invention.

FIG. 1 is a side view of a facsimile machine 1 which comprises a casing 2. A scanner part 3, a plotter part 4 and the like are provided within the casing 2.

The scanner part 3 includes prefeed rollers 5, separation rollers 6, transport rollers 7 and 8, a light source 9, mirrors 10, 11 and 12, a lens block 13, a photoelectric conversion part 14 and the like. A light emitted from the light source 9 is irradiated on document 15 which is transported by the rollers 5 through 8, and a reflected light from the document 15 is supplied to the photoelectric conversion part 14 via the mirrors 10 through 12 and the lens block 13. The reflected light is subjected to a photoelectric conversion in the photoelectric conversion part 14, and image data is supplied from the photoelectric conversion part 14 to a facsimile control part 16. The facsimile control part 16 codes the image data and modulates the coded image data in a modem (not shown) prior to transmission.

As shown in FIG. 2, the rollers 5 through 8 are rotatably supported on a pair of side plates 17a and 17b which partition the inside of the casing 2. The rollers 5 through 8 are rotated by a driving motor 19 via a gear mechanism 18. The gear mechanism 18 and the driving motor 19 are provided on the outer side of the left side plate 17a in FIG. 2. For this reason, the side plates 17a and 17b block the driving sound of the gear mechanism 18 and the driving motor 19 from being transmitted to the right portion of the casing 2.

On the other hand, the plotter part 4 includes a platen roller 20, a thermal head 21 and the like. The thermal head 21 makes a recording on a recording sheet 22 which is transported by the platen roller 20. A shaft 20a of the platen roller 20 is rotatably supported on plotter side plates (not shown), and the platen roller 20 is rotated by a driving motor 24 via a gear mechanism 23. The gear mechanism 23 and the driving motor 24 are provided on the outer side of the side plate 17a. Thus, the side plates 17a and 17b block the driving sound of the gear mechanism 23 and the driving motor 24 from being transmitted to the right portion of the casing 2.

The gear mechanism 18, the driving motor 19, the gear mechanism 23 and the driving motor 24 as a whole constitute a driving mechanism 25 which generates a noise (driving sound).

A speaker 26 and a microphone 27 of a speaker-phone are mounted within the casing 2. The speaker 26 is arranged on the upper portion of the casing 2 as shown in FIG. 1 and on the outer side of the left side plate 17a as shown in FIG. 2. The microphone 27 is arranged on the lower portion of the casing 2 as shown in FIG. 1 and on the outer side of the right side plate 17b as shown in FIG. 2. In other words, the speaker 26 and the microphone 27 are respectively arranged at the upper and lower portions of the casing 2 as shown in FIG. 1 and are distant from each other. In addition, the speaker 26 and the microphone 27 are respectively arranged on the left and right sides of the casing 2 a shown in FIG. 2 and are partitioned by the side plates 17a and 17b. On the other hand, the driving mechanism 25 and the microphone 27 are respectively arranged on the left and right sides of the casing as shown in FIG. 2 and are partitioned by the side plates 17a and 17b.

Figure 3:
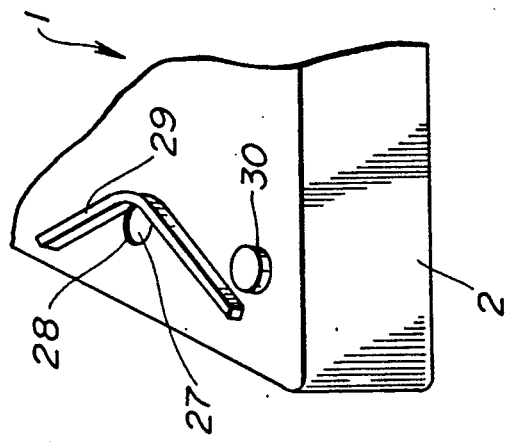
FIG. 3 is a bottom view showing an embodiment of a sound collecting wall of the first embodiment.

As shown in FIG. 3, a hole 28 is formed in a bottom of the casing 2 at a position where the microphone 27 is mounted. The microphone 27 is mounted so that a sensor portion thereof faces the hole 28. A sound collecting wall 29 is provided around the hole 28. This sound collecting wall 29 is made of a material such as resins and rubbers. The sound collecting wall 29 has an approximate V-shape which opens to the front of the facsimile machine 1, that is, to the bottom in FIG. 2 and to the left in FIG. 3. The hole 28 is positioned within the bottom portion of the V-shape. Accordingly, when an operator talks in front of the facsimile machine 1, the voice is collected by the sound collecting wall 29 and is picked up on the microphone 27 via the hole 28. A rubber leg 30 is mounted at four corners (only one shown in FIG. 3) of the bottom of the casing 2. The rubber leg 30 absorbs vibration and bumping sounds between the facsimile machine 1 and a base on which the facsimile machine 1 is placed.

Figure 4:
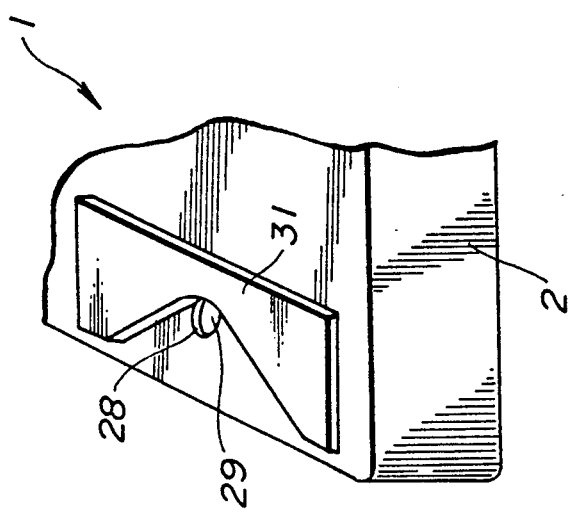
FIG. 4 is a bottom view showing another embodiment of the sound collecting wall of the first embodiment.

The sound collecting wall 29 is not limited to that shown in FIG. 3, and for example, a sound collecting wall 31 shown in FIG. 4 may be used. The sound collecting wall 31 is made of a rubber plate which has a V-shaped cutout. In this case, the sound collecting wall 31 can also function as the rubber leg.

Figure 5:
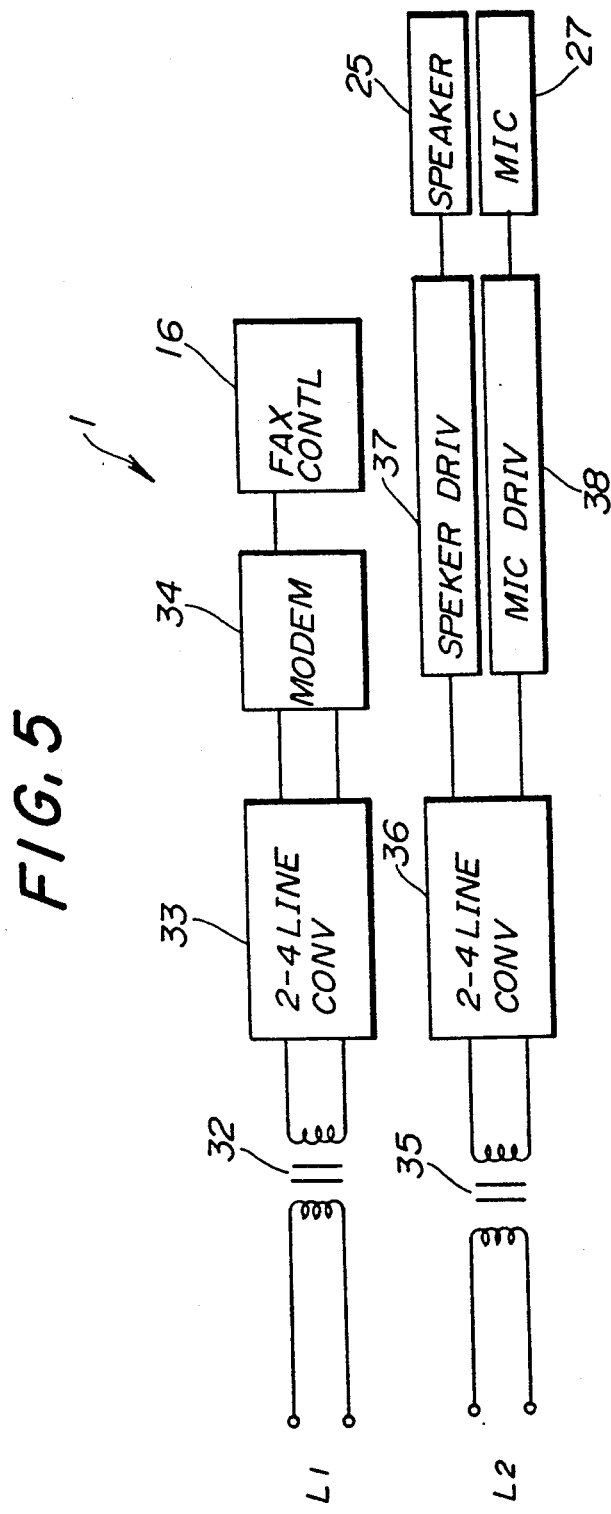
FIG. 5 is a system block diagram showing the first embodiment.

As shown in FIG. 5, the facsimile machine 1 accommodates two lines L1 and L2 and is capable of using both the lines L1 and L2 at the same time. The line L1 is coupled to the facsimile control part 16 via a transformer 32, a 2-4 line converter circuit 33 and a modem 34. The line L2 is coupled to the speaker 26 via a transformer 35, a 2-4 line converter circuit 36 and a speaker driving circuit 37 on one hand, and is coupled to the microphone 27 via the transformer 35, the 2-4 line converter circuit 36 and a microphone driving circuit 38 on the other. Hence, it is possible to simultaneously make a facsimile communication using the line L1 while making a call via the speaker-phone using the line L2.

As described above, the facsimile machine 1 accommodates the two lines L1 and L2 and is capable of simultaneously making the facsimile communication and the call via the speaker phone using the two lines L1 and L2. Accordingly, when making the facsimile transmission and the conversation simultaneously, the call is made using the speaker 26 and the microphone 27 while the gear mechanism 18 and the driving motor 19 are driven to transport the document 15. On the other hand, when making the facsimile reception and the call simultaneously, the call is made using the speaker 26 and the microphone 27 while the gear mechanism 23 and the driving motor 24 are driven to rotate the platen roller 20.

But in this embodiment, the speaker 26 and the microphone 27 are located at positions which are distant from each other in the facsimile machine 1. That is, the speaker 26 and the microphone 27 are respectively arranged at the upper and lower portions of the casing 2, and in addition, the speaker 26 and the microphone 27 are respectively arranged on the left and right sides of the casing 2 with the side plates 17a and 17b partitioning the two. For this reason, it is possible to prevent the sound from the speaker 26 from mixing into the sound which is picked up on the microphone 27, and the generation of the so-called howling is prevented. In addition, the microphone 27 and the driving mechanism 25 are respectively arranged on the left and right sides of the casing 2 with the side plates 17a and 17b partitioning the two. Hence, it is possible to prevent the driving sound from the driving mechanism 25 from mixing into the sound which is picked up on the microphone 27, and a noise-free call of a high quality can be realized. The isolation effect is especially improved by the provision of the side plates 17a and 17b, thereby eliminating the noise from the speaker 26 and the driving mechanism 25 from being picked up by the microphone 27.

Furthermore, because the hole 28 is formed in the bottom of the casing 2 at the position of the microphone 27 and the sound collecting wall 2 is provided around the hole 28, it is possible to efficiently pick up the voice of the operator while at the same time preventing external noise from mixing into the voice. Therefore, this arrangement also contributes to the further improvement of the noise-free call.

The arrangement of the speaker 26 and the microphone 27 in the casing 2 is of course not limited to that of this embodiment.

Figure 6A:
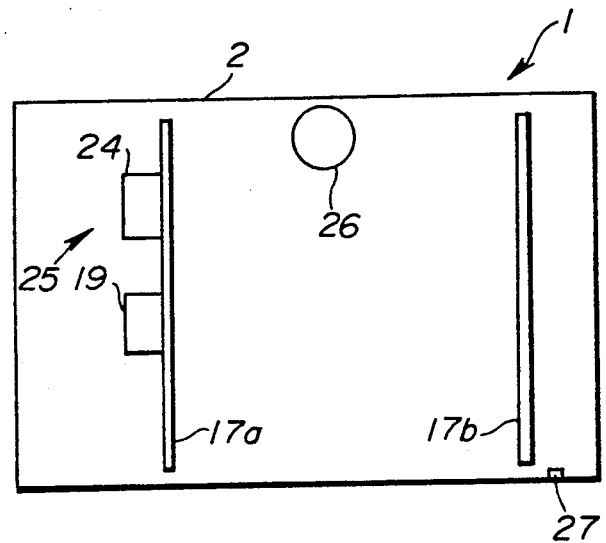
FIGS. 6A and 6B respectively are a front view and a side view of a second embodiment of the communication apparatus according to the present invention.
Figure 6B:
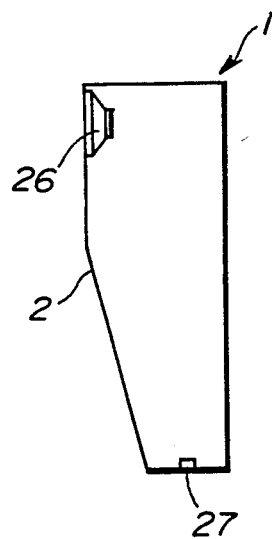

FIGS. 6A and 6B show a second embodiment of the communication apparatus according to the present invention. In FIGS. 6A and 6B, those parts which are the same as those corresponding parts in FIGS. 1 and 2 are designated by the same reference numerals, and a description thereof will be omitted. In this embodiment, the speaker 26 is arranged at the upper portion on the rear of the casing 2 and between the side plates 17a and 17b. The microphone 27 is arranged at the front of the casing 2 on the right side of the side plate 17b.

Figure 7A:
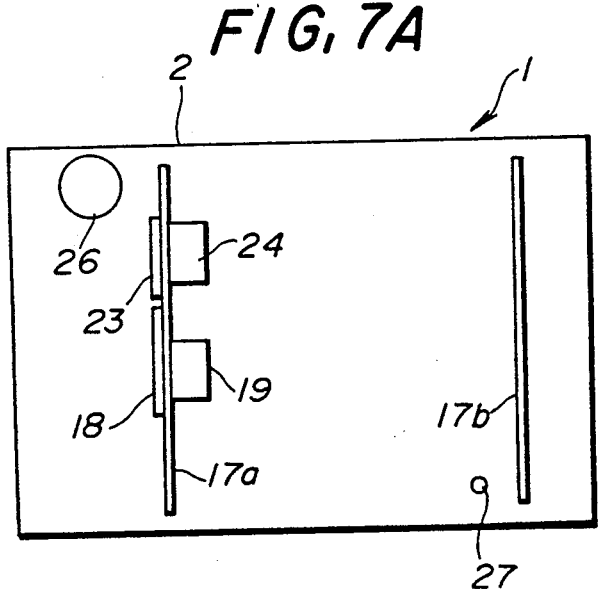
FIGS. 7A and 7B respectively are a front view and a side view of a third embodiment of the communication apparatus according to the present invention.
Figure 7B:
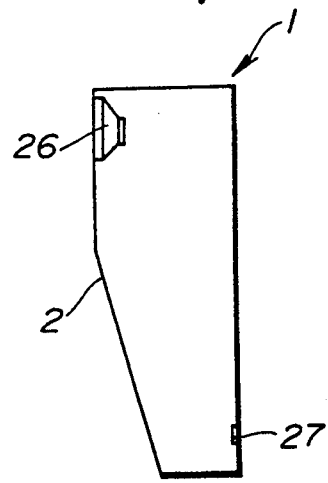

FIGS. 7A and 7B show a third embodiment of the communication apparatus according to the present invention. In FIGS. 7A and 7B, those parts which are the same as those corresponding parts in FIGS. 1 and 2 are designated by the same reference numerals, and a description thereof will be omitted. In this embodiment, the speaker 26 is arranged at the upper portion on the rear of the casing 2 and on the left of the side plate 17a. The microphone 27 is arranged at the lower portion on the front of the casing 2 and between the side plates 17a and 17b. In this embodiment, the gear mechanisms 18 and 23 are arranged on the outer side of the side plate 17a, so as to prevent the driving sound of the gear mechanisms 18 and 23 which make the largest driving sound out of the driving mechanism 25 from mixing into the sound which is picked up by the microphone 27.

The effects obtainable in the first embodiment are also obtainable in the second and third embodiments.

Next, a description will be given of a fourth embodiment of the communication apparatus according to the present invention, by referring to FIGS. 8 and 9. In this embodiment, the present invention is also applied to a facsimile machine.

Figure 8:
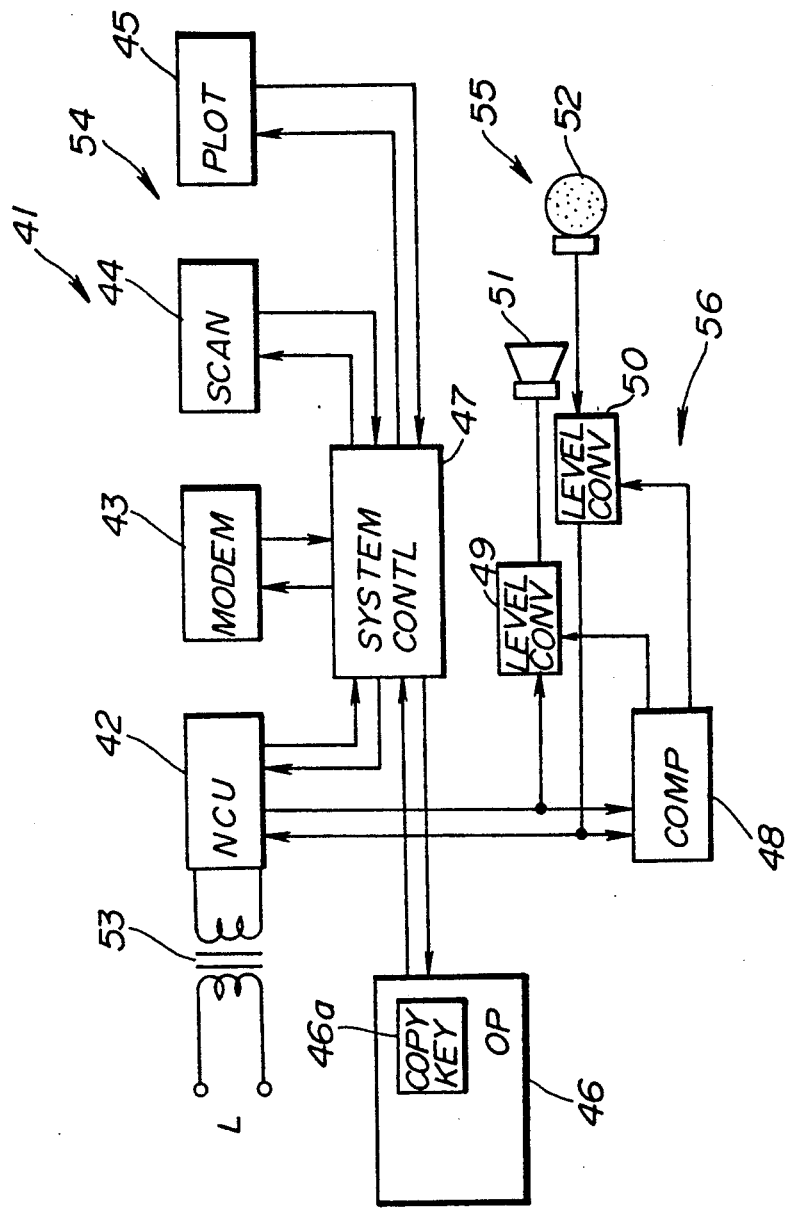
FIG. 8 is a system block diagram showing a fourth embodiment of the communication apparatus according to the present invention.

FIG. 8 shows a facsimile machine 41 which generally comprises a network control unit (NCU) 42, a modem 43, a scanner 44, a plotter 45, an operation part 46, a system controller 47, a comparing circuit 48, level converters 49 and 50, a speaker 51, and a microphone 52.

A line L is coupled to the NCU 42 via a transformer 53, and the NCU 42 controls the connection between the line L and the facsimile machine 41. In other words, the NCU 42 operates under a control of the system controller 47 to open and close the line L and to connect the line L to the modem 43 or the system controller 47. The modem 43 modulates a transmission signal and demodulates a reception signal.

For example, a line image sensor using charge coupled devices (CCDs) is used for the scanner 44. The scanner 44 reads a document image in lines and supplies an image data to the system controller 47. For example, a thermal printer using thermal elements is used for the plotter 45. The plotter 45 records an image directly on a thermally sensitive recording sheet or on a plain recording sheet via an ink sheet based on the image data which is received from the system controller 47. The scanner 44 and the plotter 45 as a whole constitute a driving mechanism 54 of the facsimile machine 41.

An operation part 46 includes a ten-key, various operation keys, a copy key 46a, a liquid crystal display and the like. The operation part 46 is provided to enable communication between the operator and the facsimile machine 41.

The system controller 47 includes a central processing unit (CPU), a read only memory (ROM), a random access memory (RAM), a coding/decoding unit, a facsimile communication unit and the like. The ROM of the system controller 47 stores basic programs of the facsimile machine 41 and a copying operation control program which is peculiar to this embodiment. Based on the programs within the ROM, the system controller 47 codes and decodes the image data in the coding/decoding unit, switches a facsimile control signal in the facsimile communication unit, carries out a sequential operation by controlling various parts of the facsimile machine 41, and carries out the copying operation control process.

In other words, the facsimile machine 41 transmits the image data which is related to the document image and is read on the scanner 44 on the line L. In addition, the facsimile machine 41 records the image data which is received via the line L onto the recording sheet in the plotter 45. In addition to these normal facsimile functions, the facsimile machine 41 also has the copying function of supplying to the plotter 45 the image data which is related to the document image and is read on the scanner 44 to record the image data onto the recording sheet in the plotter 45. During this copying mode, both the scanner 44 and the plotter 45 which constitute the driving mechanism 54 are driven.

The speaker 51 and the microphone 52 constitute a speaker-phone 55. The speaker 51 outputs as sound the reception signal which is received from the other end of the line L. The microphone 52 picks up the voice of the operator who talks near the facsimile machine 41 and outputs the transmission signal on the line L. The comparing circuit 48 compares the levels of the reception signal and the transmission signal. The comparing circuit 48 turns the level converter 49 ON and turns the level converter 50 OFF to set the mode to the reception mode when the reception signal level is greater than the transmission signal level. The level converter 49 operates to increase the level of the reception signal when turned ON (that is, in the reception mode), and operates to decrease the level of the reception signal when turned OFF (that is, in the transmission mode). On the other hand, the comparing circuit 48 turns the level converter 49 OFF and turns the level converter 50 ON to set the mode to the transmission mode when the transmission signal level is greater than the reception signal level. The level converter 50 operates to increase the level of the transmission signal when turned ON (that is, in the transmission mode), and operates to decrease the level of the transmission signal when turned OFF (that is, in the reception mode). In other words, the comparing circuit 48 and the level converters 49 and 50 constitute a function control means 56 for switching the function of the facsimile machine 41 between the transmission function and the reception function based on the comparison of the reception signal which is received from the line L and the transmission signal which is received from the microphone 52.

The facsimile machine 41 carries out a facsimile transmission operation to transmit the image data which is related to the document image read on the scanner 44 and a facsimile reception operation to record the image data which is received from the line L onto the recording sheet in the plotter 45. The facsimile machine 41 also carries out a copying operation to read the document image on the scanner 44 and record the read image onto the recording sheet in the plotter 45. Furthermore, the facsimile machine 41 can carry out a speaker-phone call between a party who is coupled to the other end of the line L via the speaker-phone 55.

When making the speaker-phone call, the howling which is generated when the sound from the speaker 51 is picked up on the microphone 52 is prevented in the following manner. That is, the comparing circuit 48 compares the signal levels of the transmission signal and the reception signal, and switches the mode between the transmission mode and the reception mode by turning ON on of the level converters 49 and 50 which is connected to the line with the larger signal level. But since the line L is not used during the copying operation, it is functionally possible to carry out the copying operation during the speaker-phone call. However, when the copying operation is carried out during the speaker-phone call, the driving sound of the driving mechanism 54 may be picked up by the microphone 52 and the comparing circuit 48 ma constantly turn ON the level converter 50. In this case, the speaker-phone 55 cannot function properly.

For this reason, when the copy key 46a is pushed during the speaker-phone call in this embodiment, the copying operation is prohibited to ensure a proper speaker-phone call.

Figure 9:
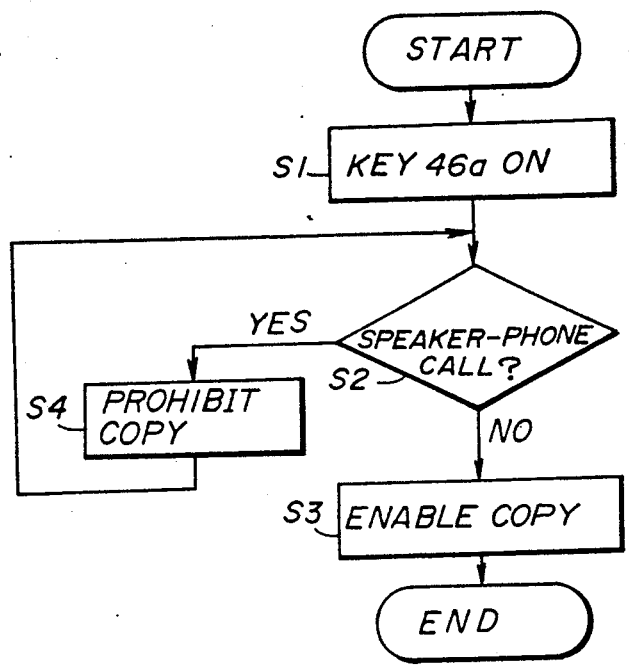
FIG. 9 is a flow chart for explaining a copying operation of the fourth embodiment.

FIG. 9 shows a flow chart for explaining the copying operation. In FIG. 9, when the copy key 46a of the operation part 46 is pushed (turned ON) in a step S1, the system controller 47 discriminates in a step S2 whether or not a speaker-phone call is being made on the speaker-phone 55. The system controller 47 discriminates whether or not the speaker-phone call is being made from the ON/OFF state of a key (not shown) which operates the speaker-phone 55. When the discrimination result in the step S2 is NO, a step S3 permits a copying operation by enabling the driving mechanism 54. On the other hand, when the discrimination result in the step S2 is YES, a step S4 prohibits the copying operation by disabling the driving mechanism 54 and the process returns to the step S2. When the discrimination result in the step S2 is NO in the state where the copying operation is prohibited, the step S3 cancels the prohibiting of the copying operation and enables the driving mechanism 54.

When the step S4 prohibits the copying operation, the speaker-phone call is being made. Hence, it is possible to inform the operator that the copying operation is prohibited by displaying a message on the liquid crystal display of the operation panel 46.

Therefore, according to this embodiment, it is possible to prevent the driving mechanism 54 from operating and interfering with the switching operation of the function control means 56 and to prevent the call from being interfered with by the driving sound of the driving mechanism 54. Therefore, a satisfactory speaker-phone call is ensured.

Next, a description will be given of a fifth embodiment of the communication apparatus according to the present invention, by referring to FIGS. 10 and 11. In this embodiment, the present invention is also applied to a facsimile machine.

FIG. 10 shows the fifth embodiment. In FIG. 10, those parts which are the same as those corresponding parts in FIG. 8 are designated by the same reference numerals, and a description thereof will be omitted. A facsimile machine 61 shown in FIG. 10 generally comprises the NCU 42, the modem 43, the scanner 44, the plotter 45, a system controller 62, the level converters 49 and 50, the speaker 51, the microphone 52, the transformer 53, a signal generating circuit 63, an adder 64, and the comparing circuit 48. The scanner 44 and the plotter 45 constitute the driving mechanism 54, and the speaker 51 and the microphone 52 constitute the speaker-phone 55.

The system controller 62 has a structure similar to that of the system controller 47 shown in FIG. 8. But in this embodiment, the ROM of the system controller 62 stores, in addition to the basic programs of the facsimile machine 61, a program for carrying out a pseudo signal transmitting process. The signal generating circuit 63 generates a pseudo signal which has a signal level which is approximately equal to the signal level of the transmission signal which is generated when the driving sound of the driving mechanism 54 is picked up by the microphone 52 during the copying operation. The operation of the signal generating circuit 63 is controlled by the system controller 62. The adder 64 adds the pseudo signal from the signal generating circuit 63 and the reception signal from the line L, and supplies an added reception signal to the comparing circuit 48.

In this embodiment, the signal generating circuit 63 generates the pseudo signal when the driving mechanism 54 is enabled and the copying operation is carried out during the speaker-phone call on the speaker-phone 55. This pseudo signal is used to ensure a proper switching operation of the function control means 56 without deteriorating the quality of the call.

Figure 11:
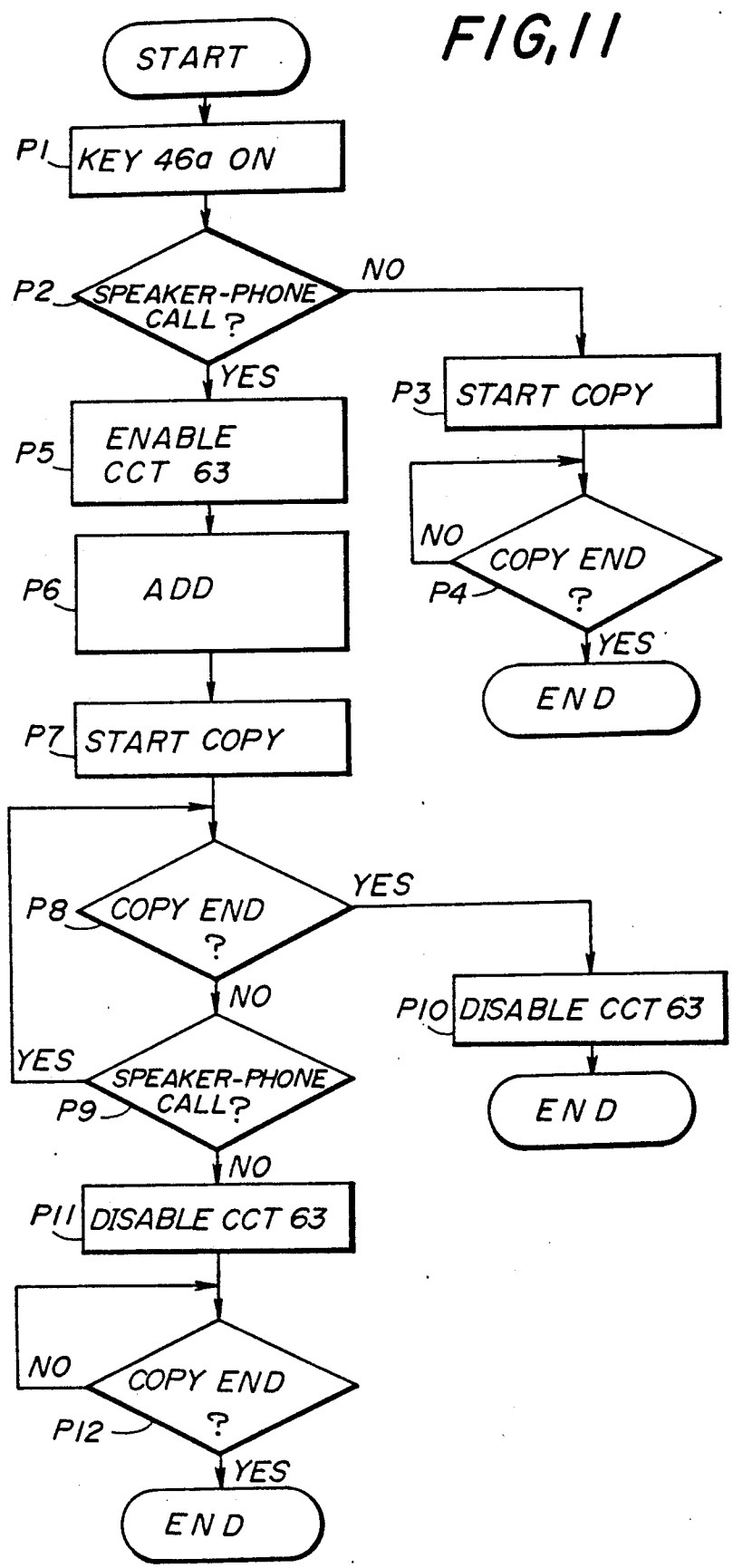
FIG. 11 is a flow chart for explaining a pseudo signal transmission operation of the fifth embodiment.

FIG. 11 is a flow chart for explaining a pseudo signal transmission operation of the fifth embodiment. When the copy key 46a of the operation part 46 is pushed (turned ON) in a step P1, the system controller 62 discriminates in a step P2 whether or not a speaker-phone call is being made on the speaker-phone 55. When the discrimination result in the step P2 is NO, a step P3 operates the driving mechanism 54 to start a copying operation. A step P4 discriminates whether or not the copying operation is ended, and the process ends when the discrimination result in the step P4 becomes YES.

On the other hand, when the discrimination result in the step P2 is YES, a step P5 enables (turns ON) the signal generating circuit 63 so as to generate the pseudo signal. A step P6 adds the pseudo signal from the signal generating circuit 63 and the reception signal from the line L in the adder 64, and supplies an added reception signal to the comparing circuit 48. A step P7 starts a copying operation, and a step P8 discriminates whether or not the copying operation is ended. When the discrimination result in the step P8 is YES, a step P10 disables (turns OFF) the signal generating circuit 63 and the process ends. On the other hand, when the discrimination result in the step P8 is NO, a step P9 discriminates whether or not the speaker-phone call is being made on the speaker-phone 55. The process returns to the step P8 when the discrimination result in the step P9 is YES. A step P11 disables the signal generating circuit 63 when the discrimination result in the step P9 is NO. A step P12 discriminates whether or not the copying operation is ended, and the process ends when the discrimination result in the step P12 becomes YES.

Therefore, the pseudo signal is added to the reception signal when the speaker-phone call and the copying operation are carried out simultaneously. According to this embodiment, it is possible to prevent the driving mechanism 54 from operating and interfering with the switching operation of the function control means and to prevent the call from being interfered by the driving sound of the driving mechanism 54, and a satisfactory speaker-phone call is ensured.

The description above does not refer to a case where the speaker-phone call is made during the copying operation. But it is readily apparent that the signal generating circuit 63 can be operated in a manner similar to the above to ensure a satisfactory speaker-phone call.

Next, a description will be given of a sixth embodiment of the communication apparatus according to the present invention, by referring to FIGS. 12 through 14. In this embodiment, the present invention is also applied to a facsimile machine.

Figure 12:
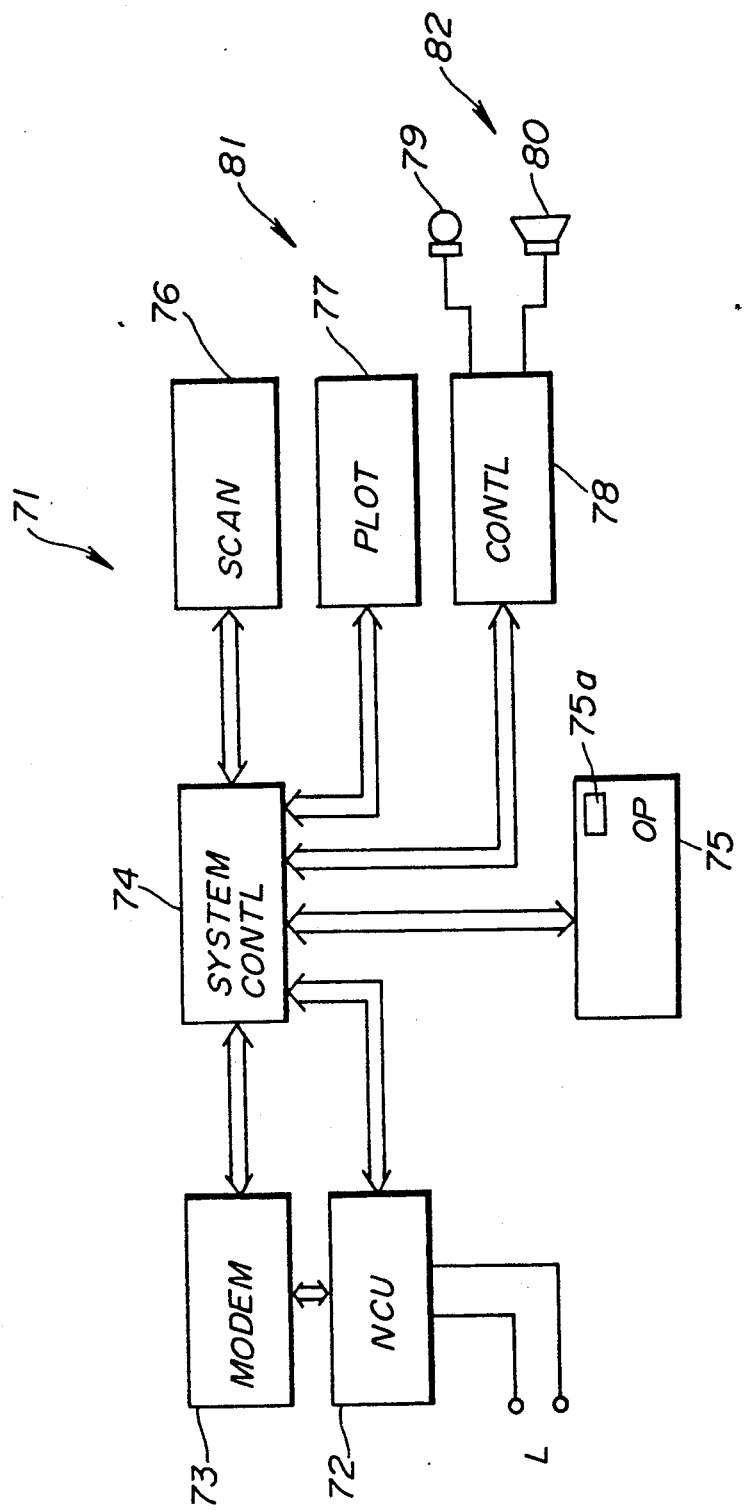
FIG. 12 is a system block diagram showing a sixth embodiment of the communication apparatus according to the present invention.

FIG. 12 shows a facsimile machine 71 which generally comprises an NCU 72, a modem 73, a system controller 74, an operation part 75, a scanner 76, a plotter 77, a speaker-phone controller 78, a microphone 79, and a speaker 80.

A line L such as a telephone line and a private line is connected to the NCU 72, and the NCU controls the connection of the line L and the facsimile machine 71. The modem 73 modulates a transmission signal and demodulates a reception signal. The system controller 74 comprises a CPU, a ROM, a RAM, a coding/decoding unit, a facsimile communication unit and the like. The ROM of the system controller 74 stores basic programs of the facsimile machine 71 and a speaker volume control program which is peculiar to this embodiment. Based on the programs within the ROM, the system controller 74 codes and decodes the image data in the coding/decoding unit, switches a facsimile control signal in the facsimile communication unit, carries out a sequential operation by controlling various parts of the facsimile machine 71, and carries out the speaker volume control process.

The operation part 75 includes a ten-key, various operation keys, a copy key 75a, a liquid crystal display and the like. The operation part 75 is provided to enable a communication between an operator and the facsimile machine 71.

For example, an image sensor using charge coupled devices (CCDs) is used for the scanner 76. The scanner 76 reads a document image and supplies an image data to the system controller 74. For example, a thermal printer using thermal elements is used for the plotter 77.

The plotter 77 records an image directly on a thermally sensitive recording sheet or on a plain recording sheet via an ink sheet based on the image data which is received from the system controller 74. The scanner 76 and the plotter 77 as a whole constitute a driving mechanism 81 of the facsimile machine 71.

The speaker-phone controller 78 controls the operation of the microphone 79 and the speaker 80. The speaker-phone controller 78, the microphone 79 and the speaker 80 as a whole constitute a speaker-phone 82. The microphone 79 picks up the voice of the operator who talks near the facsimile machine 71 and supplies a transmission signal to the line L. The speaker 80 outputs a reception signal which is received from the line L as sound.

Figure 13:
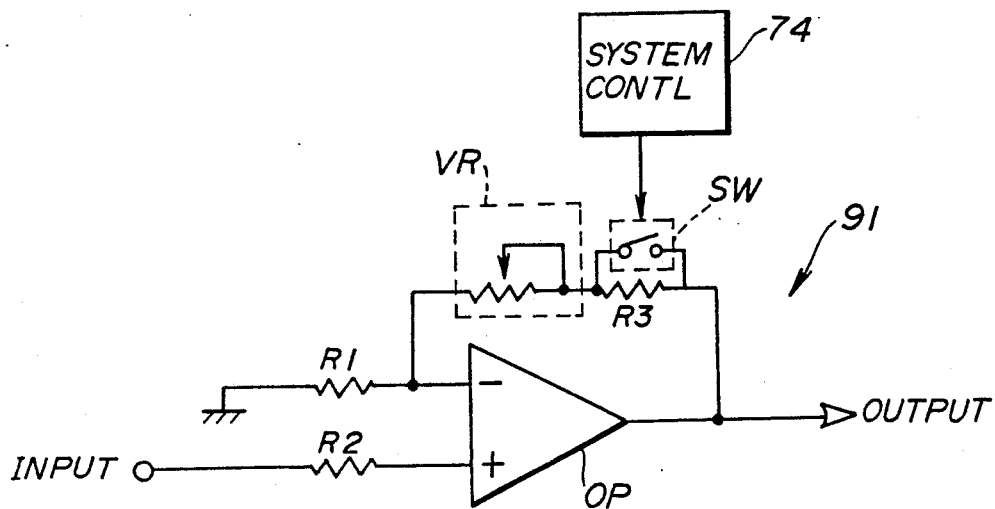
FIG. 13 is a circuit diagram showing an embodiment of a speaker amplifier circuit of the sixth embodiment.
Figure 14:
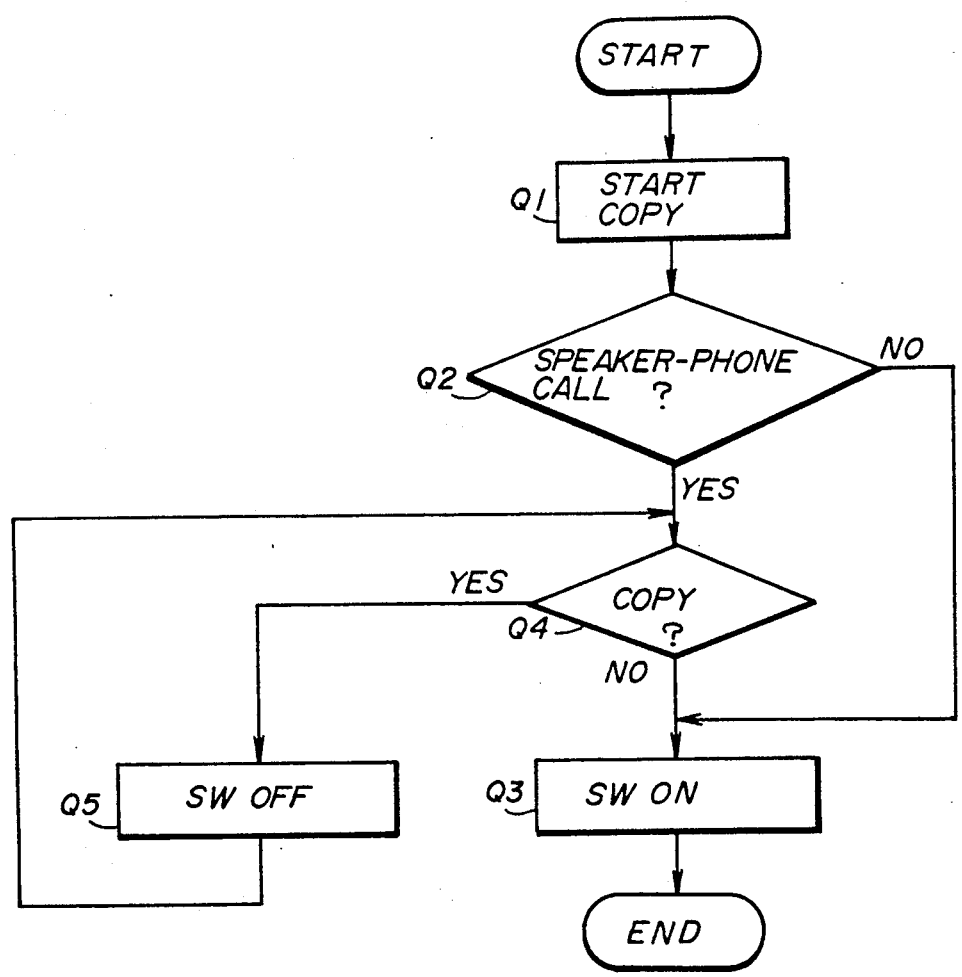
FIG. 14 is a flow chart for explaining a speaker volume control operation of the sixth embodiment.

In this embodiment, the speaker-phone controller 78 includes a speaker amplifier circuit which has a structure shown in FIG. 13. A speaker amplifier circuit 91 comprises a variable resistor VR, a switch SW, resistors R1, R2 and R3, and an operational amplifier OP. The amplifier circuit 91 amplifies the reception signal from the line and supplies the amplified reception signal to the speaker 80. The variable resistor VR is operated by the operator to adjust the volume of sound output from the speaker 80. The switch SW is turned ON/OFF responsive to an ON/OFF signal from the system controller 74. This switch SW is connected to by-pass the resistor R3 when turned ON. Accordingly, the amplifier circuit 91 sets the volume of the speaker 80 to a low value when the switch SW is ON and sets the volume to a high value when the switch SW is OFF.

The facsimile machine 71 carries out a facsimile transmission operation to transmit, via the modem 73 and the NCU 72, the image data which is related to the document image read on the scanner 76 and a facsimile reception operation to record the image data which is received from the line L onto the recording sheet in the plotter 77. The facsimile machine 71 also carries out a copying operation to read the document image on the scanner 76 and record the read image onto the recording sheet in the plotter 77. Furthermore, the facsimile machine 71 can carry out a speaker-phone call between a party who is coupled to the other end of the line L via the speaker-phone 82.

When making the speaker-phone call, the voice received from the other party is output from the speaker 80 and it is difficult to understand the content of the call when the copying operation of the facsimile machine 71 is carried out during the speaker-phone call.

Hence, in this embodiment, the volume of the speaker 80 is automatically increased when the driving mechanism 81 is driven during the speaker-phone call or when the speaker-phone call is made while the driving mechanism 81 is driven. FIG. 14 shows a flow chart for explaining the speaker volume control operation. In FIG. 14, when the copy key 75a of the operation part 75 is pushed (turned ON) in a step Q1, the system controller 74 discriminates in a step Q2 whether or not a speaker-phone call is being made on the speaker-phone 82. When the discrimination result in the step Q2 is NO, a step Q3 maintains the switch SW in the ON state. On the other hand, when the discrimination result in the step Q2 is YES, a step Q4 discriminates whether or not a copying operation is being carried out. When the discrimination result in the step Q4 is YES, a step Q5 sets the switch SW in the OFF state and the process returns to the step Q4. When the copying operation ends thereafter and the discrimination result in the step Q4 becomes NO, the step Q3 sets the switch SW to the ON state so as to return the volume of the speaker 80 to the value which is set by the operator by adjusting the variable resistor VR.

Therefore, when the speaker-phone call and the copying operation are carried out simultaneously, it is possible to automatically increase the volume of the speaker 80. As a result, it is possible to prevent the noise of the driving mechanism 81 from interfering with the understanding of the contents of the call which is received from the other party. In other words, it is possible to realize a satisfactory speaker-phone call.

In this embodiment, the facsimile machine 71 accommodates only one line L, but it is of course possible to accommodate a plurality of lines. In this case, measures are taken so that the volume of the speaker 80 is increased automatically not only during the copying operation but also when a facsimile transmission or reception is made on a line during a speaker-phone call which is made on another line.

The present invention is applied to the facsimile machine in each of the described embodiments. However, the present invention is applicable to any communication apparatus in general which is provided with a speaker-phone function and a driving mechanism.

In the fifth embodiment shown in FIG. 10, it is of course possible to use a subtracting circuit in place of the adder 64. In this case, the subtracting circuit subtracts the pseudo signal from the reception signal and supplies a subtracted reception signal to the comparing circuit.

Further, the present invention is not limited to these embodiments, but various variations and modifications may be made without departing from the scope of the present invention.

What is claimed is:

1. A communication apparatus comprising:
 a casing, wherein said casing has first and second partitioning plates which partition an inside of said casing into three spaces;
 a driving mechanism provided within said casing, said driving mechanism generating a driving sound when enabled; and
 a speaker-phone including a speaker and a microphone for making a hand-free call when enabled,
 said driving mechanism being arranged at a position within said casing isolated from said microphone,
 said speaker being arranged at a position on said casing isolated from said microphone,
 said driving mechanism, said speaker and said microphone being respectively arranged in mutually different spaces;
 said communication apparatus having a mode in which both said driving mechanism and said speaker-phone are enabled simultaneously.

2. A communication apparatus comprising:
 a casing, wherein said casing has at least one partitioning plate which partitions an inside of said casing;
 a driving mechanism provided within said casing, said driving mechanism generating a driving sound when enabled; and
 a speaker-phone including a speaker and a microphone for making a hand-free call when enabled,
 said driving mechanism being arranged at a position within said casing isolated from said microphone,
 said speaker being arranged at a position on said casing isolated from said microphone, said driving mechanism and said speaker being arranged on one side of said partitioning plate, said microphone being arranged on another side of said partitioning plate;

said communication apparatus having a mode in which both said driving mechanism and said speaker-phone are enabled simultaneously.

3. The communication apparatus as claimed in claim 2 wherein said casing has a hole and a wall which is formed around said hole on an outer surface of said casing, said microphone being mounted over said hole on an inner surface of said casing, said wall having an approximate V-shape which opens in a predetermined direction away from said driving mechanism and said speaker.

4. The communication apparatus as claimed in claim 2 which further comprises a scanner and a plotter, said driving mechanism including motors and gear mechanisms of said scanner and said plotter.

5. The communication apparatus as claimed in claim 4 wherein one of said scanner and said plotter is operated during a facsimile communication in said mode in which both said driving mechanism and said speaker-phone are enabled simultaneously.

6. The communication apparatus as claimed in claim 4 wherein said scanner and said plotter are operated to make a copying operation in said mode in which both said driving mechanism and said speaker-phone are enabled simultaneously.

7. A communication apparatus comprising:
a driving mechanism which generates a driving sound when enabled;
a speaker-phone including a speaker and a microphone for making a hand-free call when enabled;
detecting means coupled to said speaker-phone for detecting whether or not said speaker-phone is in use;
a scanner and a plotter, said driving mechanism including motors and gear mechanisms of said scanner and said plotter; and
control means coupled to said driving mechanism and said detecting means for disabling said driving mechanism when the use of said speaker-phone is detected by said detecting means.

8. The communication apparatus as claimed in claim 7 wherein said control means disables at least one of said scanner and said plotter when the use of said speaker-phone is detected by said detecting means.

9. The communication apparatus as claimed in claim 7 wherein said control means enables at least one of said scanner and said plotter in a facsimile communication mode and enables both said scanner and said plotter in a copying mode.

10. A communication apparatus comprising:
a driving mechanism which generates a driving sound when enabled;
a speaker-phone coupled to at least one line and including a speaker and a microphone for making a hand-free call when enabled;
function control means coupled to said speaker-phone for controlling said speaker-phone between a transmission function and a reception function based on a comparison of a level of a transmission signal received from said microphone and a level of a reception signal received from the line;
signal generating means for generating a pseudo signal which has a level approximately equal to a transmission signal which is generated when the driving sound of said driving mechanism is picked up on said microphone;
operation means coupled to the line for adding or subtracting the pseudo signal with respect to to the reception signal which is supplied to said function control means when the pseudo signal is generated from said signal generating means; and
control means coupled to said signal generating means for controlling said signal generating means to generate the pseudo signal only during a mode in which both said driving mechanism and said speaker-phone are enabled simultaneously.

11. The communication apparatus as claimed in claim 10 which further comprises a scanner and a plotter, said driving mechanism including motors and gear mechanisms of said scanner and said plotter.

12. The communication apparatus as claimed in claim 11 wherein one of said scanner and said plotter is operated during a facsimile communication in said mode in which both said driving mechanism and said speaker-phone are enabled simultaneously.

13. The communication apparatus as claimed in claim 11 wherein said scanner and said plotter are operated to make a copying operation in said mode in which both said driving mechanism and said speaker-phone are enabled simultaneously.

14. A communication apparatus comprising:
a driving mechanism which generates a driving sound when enabled;
a speaker-phone including a speaker and a microphone for making a hand-free call when enabled;
detecting means coupled to said driving mechanism for detecting whether or not said driving mechanism is in use; and
control means coupled to said speaker-phone and said detecting means for automatically controlling a volume of sound output from said speaker depending on a detection result of said detecting means,
said communication apparatus having a mode in which both said driving mechanism and said speaker-phone are enabled simultaneously.

15. The communication apparatus as claimed in claim 14 wherein said control means automatically increases the volume of the sound output from said speaker when the use of said driving mechanism is detected in said detecting means.

16. The communication apparatus as claimed in claim 15 which further comprises a scanner and a plotter, said driving mechanism including motors and gear mechanisms of said scanner and said plotter.

17. The communication apparatus as claimed in claim 16 wherein one of said scanner and said plotter is operated during a facsimile communication in said mode in which both said driving mechanism and said speaker-phone are enabled simultaneously.

18. The communication apparatus as claimed in claim 16 wherein said scanner and said plotter are operated to make a copying operation in said mode in which both said driving mechanism and said speaker-phone are enabled simultaneously.

* * * * *